US009489472B2

(12) United States Patent
Lee et al.

(10) Patent No.: US 9,489,472 B2
(45) Date of Patent: Nov. 8, 2016

(54) METHOD AND APPARATUS FOR DETECTING INTERFERENCE IN DESIGN ENVIRONMENT

(71) Applicant: Gehry Technologies, Los Angeles, CA (US)

(72) Inventors: Jaemin Lee, Torrance, CA (US); Jim Chi-Kwan Cheung, Santa Monica, CA (US); Dennis Shelden, Calabasas, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 13/717,371

(22) Filed: Dec. 17, 2012

(65) Prior Publication Data

US 2014/0180641 A1    Jun. 26, 2014

Related U.S. Application Data

(63) Continuation-in-part of application No. 13/717,620, filed on Dec. 17, 2012.

(60) Provisional application No. 61/576,921, filed on Dec. 16, 2011, provisional application No. 61/576,892, filed on Dec. 16, 2011.

(51) Int. Cl.
*G06F 17/50* (2006.01)

(52) U.S. Cl.
CPC ........... *G06F 17/50* (2013.01); *G06F 2217/04* (2013.01)

(58) Field of Classification Search
USPC .......................................................... 703/1
See application file for complete search history.

(56) References Cited

U.S. PATENT DOCUMENTS

| 5,422,987 | A  | 6/1995  | Yamada         |
|-----------|-----|---------|----------------|
| 5,880,722 | A  | 3/1999  | Brewer et al.  |
| 6,230,116 | B1 | 5/2001  | Ronen et al.   |
| 6,438,494 | B1 | 8/2002  | Yamamoto et al.|
| 7,778,723 | B2 | 8/2010  | Cregger        |
| 8,112,721 | B2 | 2/2012  | Nakamura       |
| 8,606,774 | B1 | 12/2013 | Makadia et al. |
| 8,754,887 | B2 | 6/2014  | Kuffner et al. |

(Continued)

FOREIGN PATENT DOCUMENTS

KR    10-0718157 B1    5/2007

OTHER PUBLICATIONS

Lucchesi, Benjamin J., "A Parallel Octree Collision Detection Algorithm", University of Nevada, Reno, May 2002.

(Continued)

*Primary Examiner* — Saif Alhija
(74) *Attorney, Agent, or Firm* — Kilpatrick Townsend & Stockton LLP (57) ABSTRACT

The disclosure provides a solution for clash detection in three-dimensional design by allowing multiple members to work on a centrally-located version of the model. The disclosure also provides massively-parallel processing of the design file which enables rapid processing and version control. The model can be maintained at one or more remote servers with significantly higher processing capability. Implementing clash detection on the remote server allows the system to take advantage of parallel processing. Complex 3D models can be identified and divided across multiple computational units to significantly increase processing speed.

18 Claims, 6 Drawing Sheets

(56) References Cited

U.S. PATENT DOCUMENTS

| | | |
|---|---|---|
| 8,762,856 B2 | 6/2014 | Nykamp |
| 2002/0158905 A1 | 10/2002 | Bazzoni et al. |
| 2003/0117402 A1* | 6/2003 | Hubrecht ................ G06T 17/00 345/473 |
| 2004/0181548 A1* | 9/2004 | Thomas ............ G06F 17/30265 |
| 2005/0182979 A1* | 8/2005 | Gross et al. .................. 713/300 |
| 2007/0136093 A1 | 6/2007 | Rankin et al. |
| 2009/0018808 A1 | 1/2009 | Bronstein et al. |
| 2009/0106674 A1 | 4/2009 | Bray et al. |
| 2009/0307640 A1* | 12/2009 | Chapman ............ G06F 17/5045 716/136 |
| 2009/0326876 A1 | 12/2009 | Miller |
| 2010/0223032 A1 | 9/2010 | Reghetti et al. |
| 2011/0078801 A1 | 3/2011 | Bae |
| 2011/0202318 A1 | 8/2011 | Demizu et al. |
| 2013/0235037 A1 | 9/2013 | Baldwin et al. |
| 2013/0271461 A1 | 10/2013 | Baker |

OTHER PUBLICATIONS

International Search Report issued on Apr. 30, 2013 for PCT Application No. PCT/US2012/070205.
US Non-Final Office Action issued for U.S. Appl. No. 13/717,620 on Nov. 20, 2014.

* cited by examiner

METHOD AND APPARATUS FOR DETECTING INTERFERENCE IN DESIGN ENVIRONMENT

RELATED APPLICATIONS

The present application claims priority to U.S. Provisional Application No. 61/576,921 (filed Dec. 16, 2011) and to U.S. Provisional Application No. 61/576,892 (filed Dec. 16, 2011), both of which are fully incorporated herein by reference.

The present application is related to U.S. patent application Ser. No. 13/71,620 entitled "Method and Apparatus for Representing 3D Thumbnails" filed on an even date herewith and fully incorporated herein by reference.

BACKGROUND

1. Field of the Invention

The disclosure relates to method and apparatus for detecting interference in a design. More specifically, the disclosure relates to novel method and apparatus for identifying when elements of computer design physically interfere or clash with each other.

2. Description of Related Art

The use of 3D models built by computer aided modeling design (CAD) tools has improved the ability to design and build three dimensional structures. CAD models enable structural, mechanical, electrical and plumbing designs with great efficiency. The electronic design files may also be used to control machine operations. Such designs may be for buildings, ships, automobiles and the like. The design typically includes the overall structure as well as the individual parts of the structure. CAD tools have alleviated the need for hand-drawn plans and have vastly improved design efficiency and accuracy.

Conventional CAD models typically include different files with each file defining an aspect of the design. For example, a building's CAD model may include a structural CAD file, an electrical CAD file, a plumbing CAD file and a mechanical CAD file. Different designers may collaborate or be independently responsible for each aspect of the design. It is important to detect interference between different components (objects) of the design. For example, a building's 3D model may include clash points between structural and plumbing components. It is important to identify and remedy such clashes before investing in the actual constructions.

The design files are complex data files consuming much of the processor's bandwidth. Moreover, conventional design files have different formats such that a project coordinator may have to facilitate information transfer between design files with incompatible formats. Thus, there is a need for a method and system for detecting interferences (e.g., clashes) between design components. There is also a need for a precision tool that enables material, inventory, project prioritization and cost control.

SUMMARY

Three-dimensional models allow accurate visualization of a structure before it is built. Such models accurately illustrate the placement of various components in relation to each other. The components can be objects in the 3D model. Depending on the design criteria, it may be desirable to have predefined distances (tolerance) between certain components. In one embodiment, the disclosure relates to method and apparatus for detecting interference between physical components of a design model. In another embodiment, the disclosure relates to identifying clashes between components of a model. In still another embodiment, the disclosure provides method and apparatus for identifying where certain design parameters have been violated.

In still another embodiment, the disclosure relates to an apparatus for detecting interference between components in a design, the apparatus comprising: a processor circuit in communication with a memory circuit, the memory circuit providing instructions for the processor to: (1) receive a first file containing a plurality of first design components, the plurality of first design components defining a first design aspect; (2) receive a second file containing a plurality of second design components, the plurality of second design components defining a second design aspect; (3) convert the first file and the second file to a neutral format; (4) identify a reference point common to the plurality of first design components and the plurality of second design components; (5) overlay the first plurality of components over the second plurality of components; (6) identify an interference between at least one of the first plurality of components and one of the second plurality of components; and (7) report the identified interference.

In still another embodiment, the disclosure is directed to an apparatus for detecting interference between components in a design, the apparatus comprising: a processor circuit in communication with a memory circuit, the memory circuit providing instructions for the processor to: receive a first file containing a plurality of first design components, the plurality of first design components defining a first design aspect; receive a second file containing a plurality of second design components, the plurality of second design components defining a second design aspect; identify a reference point common to the plurality of first design components and the plurality of second design components; resolve the first plurality of components over the second plurality of components to form a compiled file; partition the complied file into a plurality of spatially independent portions, each portions defining at least one of the first or the second plurality of components; defining a bounding box for each of the plurality of the first components and the second components; identify an interference between two discrete components when the distance between two adjacent bounding boxes is below a minimum threshold value.

In still another embodiment, the disclosure provides a method for detecting interference between components in a design, the apparatus comprising: at a processor circuit in communication with a memory circuit, receiving a design file containing a plurality of discrete components resolved relative to each other; partitioning the design components into a first spatially independent partitions, each of the first partitions containing at least one of the plurality of discrete components; subdividing one of the first spatially independent partitions into second spatially independent partitions; forming a plurality of bounding boxes to enclose each respective components of the first and the second spatially independent partitions; and identifying an interference between two discrete components when a distance between two adjacent bounding boxes is below a threshold value.

In an embodiment of the disclosure, multiple design files of a model are combined to form a master file. The master file is then partitioned according to an algorithm such that each partition includes one or more component (objects). Partitioning can be implemented using 3D partitioning algorithms such as Octree. Once partitioned to multiple segments, each segment is assigned to an independent processor for clash/interference detection, or multiple segments can be assigned to one processor. Alternatively, the assignment may be done so as to have an overlapping assignment to processors such that two processors work on overlapping portions of the model. The processors may work independently of each other, or the processors may work conjunctively during or after the clash detection process. The interference results from all the processors are compiled to form a clash/interference report for the entire 3D model.

In still another embodiment of the disclosure, multiple design files of a 3D model are combined to form a master file. The master file is then subdivided into multiple parts. Each part is assigned to a separate processor for further processing. Alternatively, the assignment may be done so as to have overlapping assignment to processors, such that two processors work on overlapping portions of the model. Each processor then independently partitions its respective portion of the 3D file into segments. Each processor may implement a 3D partitioning algorithms such as Octree to partition its respective portion of the 3D design into segments. Next, each processor implements clash/interference detection to identify clashing or interfering components in a segment or in between different segments. The processors may work independently of each other, or the processors may work conjunctively with each other during or after the clash detection process. The interference results from all the processors is then compiled to form a clash/interference report for the entire 3D model.

BRIEF DESCRIPTION OF THE DRAWINGS

These and other embodiments of the disclosure will be discussed with reference to the following exemplary and non-limiting illustrations, in which like elements are numbered similarly, and where.

DETAILED DESCRIPTION

The disclosure provides a solution for clash detection in three-dimensional designs by allowing multiple members to work on a centrally-controlled version of the model. The disclosure also provides massively-parallel processing of the design file which, among others, enables rapid processing and version control. The model can be maintained at a remote server with significantly higher processing capability. Implementing clash detection on the remote server allows the system to take advantage of parallel processing. Complex 3D models can be readily identified and divided across multiple computational units. Each computational unit can be addressed to significantly increase processing speed.

Figure 1A:
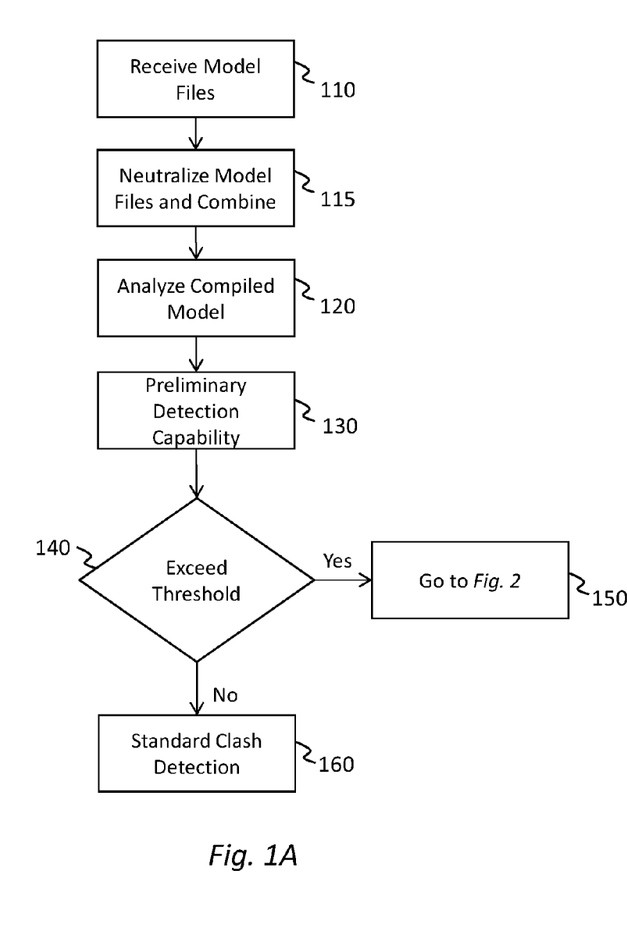
FIG. 1A is a flow diagram for implementing an embodiment of the disclosure.

FIG. 1 is a flow diagram for implementing an embodiment of the disclosure. The flow diagram of FIG. 1 may be implemented at a computer, at a remote server or as an application on a web-browser. The flow diagram may be implemented as an application software (or firmware) residing on a memory circuit in communication with a processor circuit. Each of the memory circuit or the processor circuit may comprise multiple memory modules and processor modules.

At step 110, the application receives CAD files relating to the design. The CAD files may comprise multiple files with varying formats. For example, the files may include electrical, mechanical or structural models which contribute to the overall design. Each of file may have a different format. Accordingly, at step 115, the received files are converted into a common format, i.e., neutralized. The neutral format can be any format suitable for the application. After neutralization, the various design files may be combined to form a master file (i.e., compiled model).

Figure 2:
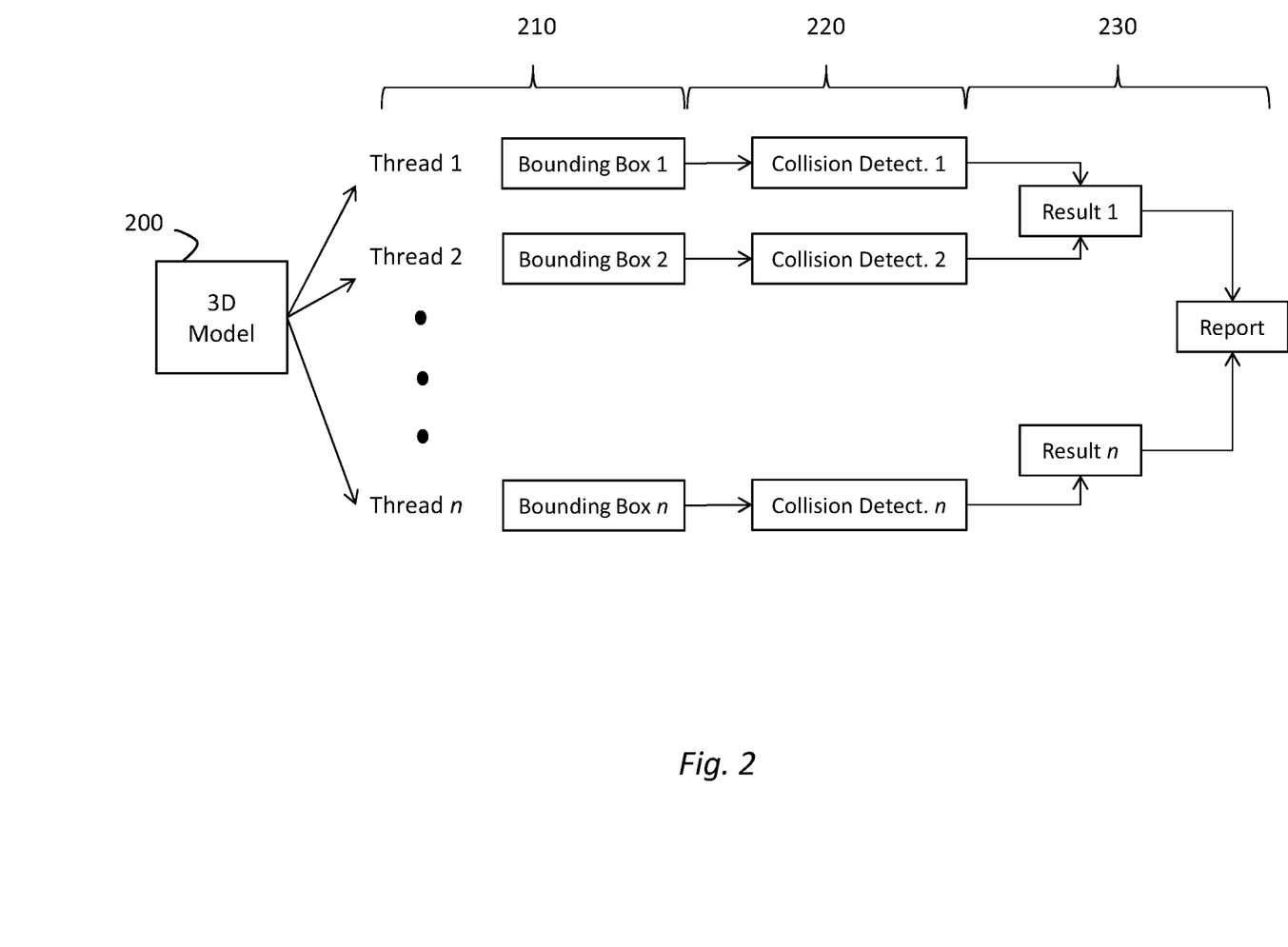
FIG. 2 schematically illustrates partitioning a 3D model for efficient clash detection.

At step 120, the master file is examined to determine the file's preliminary clash detection processing requirements. This can be evaluated, for example, by examining the size of the master file and processing resources required to run clash detection for such file. If the master file is large, the application executes a series of steps as shown in FIG. 2. On the other hand, if the master file is not extensive enough to warrant additional processing resources, at step 160, standard clash detection is run.

Figure 1B:
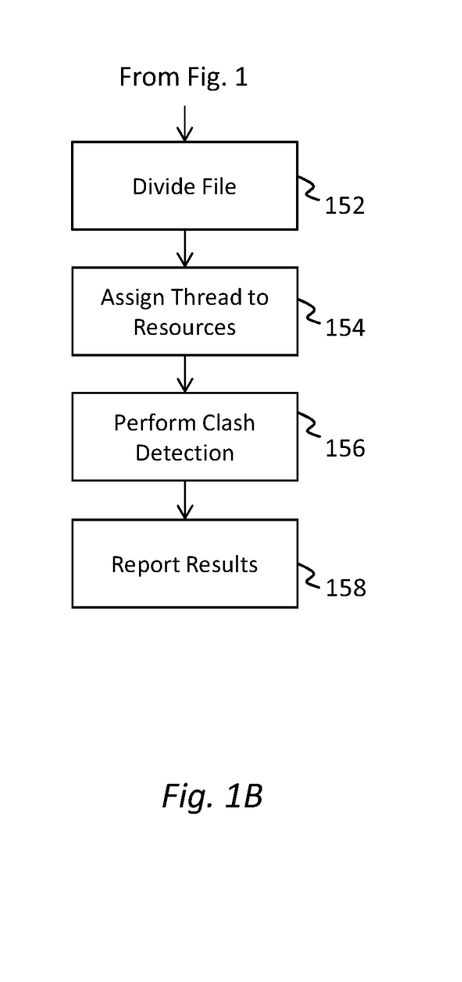
FIG. 1B is a flow diagram showing step 150 of FIG. 1.

FIG. 1B is a flow diagram of step 150 shown in FIG. 1. At step 152, the master file is partitioned into segments. Each segment may include one or more components. In one implementation, the master file is partitioned into segment (interchangeably, threads) with each segment having one or more components. A component can be any device, material or formation. For example, a component may be a door, a sump pump or a heating unit. Next, a bounding box is provided for each component of the master file. A bounding box is the smallest geometrical enclosure that can contain the entire component.

At step 154, processing resources are assigned to different segments of the master file for clash detection. Each segment may include one or more components. Segment selection can be automated by software or, as discussed below, can be controlled by the project coordinator. At step 156 clash detection is done. Clash detection can be performed, for example, on the basis of proximity of the components. Clash detection may also be used to identify physical interference between components. For example, a particular design may require sufficient repair space adjacent a mechanical unit. Clash detection can identify whether nearby objects protrude in the clearance space of the mechanical unit. Clash and interference detection can cover all dimensions. Finally, the clash detection results are reported at step 158.

FIG. 2 schematically illustrates partitioning a 3D model into parallel processing units for efficient clash detection. In FIG. 2, model 200 may be a building, an airplane or any other structural system. As shown in FIG. 2, the model is divided into threads 210 using bounding boxes 1-n. Each thread may include one or more bounding boxes. In addition, different threads may have different bounding boxes.

At step 220, independent processing resources are applied to each of the respective threads. The resources may be massively parallel processing systems, each processing system computing clash probability for a respective thread or a portion thereof. The massively-parallel processing system may or may not be co-located with each other. In an exemplary embodiment, processing is done using cloud technology in which different cloud resources are allocated to different threads. At step 230, collision detection results are gathered from the parallel processing systems. As stated, the results may identify collision between components or impingement on allotted space at or near the various components. Collision detection is not limited to 2D detection and may include overhead space and other design intangibles. Interference detection may be directed at adjacent objects or at objects within a given proximity. For example, a fire emergency area may be monitored for obstacles which impede egress. Finally, the collision detection reports are compiled and the result is displayed.

In an exemplary system for implementing clash detection, a processor circuit communicates with a memory circuit. The processor circuit and the memory circuit may be at remote servers, for example, on a distributed cloud network. Each of the processor and memory circuits may include functional elements needed for complex mathematical calculations. A processor circuit and memory may include computer system accessible through a network.

The memory circuit provides instructions for the processor to receive multiple CAD files. Each file containing a particular aspect of the design (e.g., mechanical, electrical, structural). Each file also includes multiple design components (e.g., doors, windows, pumps). Thus, the design components of the first file may represent the structural aspect of the model, showing doors and windows within the structure. The clash detection system also receives a second file containing the mechanical aspect of the model, including placement of mechanical components within the structure. The first file and the second file may have different, incompatible and vendor-specific formats. The clash detection application converts both design files to a neutral format suitable for parallel processing. The application also identifies a common reference point for each of the design models.

Using the common reference point, the clash detection system then resolves the structural components (components from the first file) over the mechanical components (components from the second file) to form a master file. In a non-limiting implementation, the first file is saved while the objects in the second file are not saved; rather, they are tested for clash one-by-one against the objects in the saved file.

The processing requirement for clash-detection of the master file can easily exhaust local resources. To address this problem, the clash detection application may partition the master file into a plurality of spatially independent portions or segments. An exemplary algorithm for partitioning 3D graphics of the master file is the octree algorithm.

The octree algorithm applies a tree structure in which each internal node has exactly eight sub-nodes or children. Octree is used to partition a three dimensional space by recursively subdividing it into eight octants where the octants are three-dimensional analogs of quadtrees. In this manner a complex 3D model is recursively subdivided until a plurality of simpler octants or independent segments are formed. Each independent segment defines at least one structural or mechanical component.

A bounding box is then formed around each of the plurality of the partitioned components. An interference or a clash point can be identified when the distance between two proximal objects are below a predefined threshold value. Since numerous clash detections are processed independently of each other, interferences can be identified efficiently and accurately.

The task of partitioning a file into spatially independent segments may be done iteratively such that each segment is further sub-divided until such time that each component is entirely enclosed in a bounding box. In this implementation, the bounding box is the smallest spatial enclosure that completely encapsulates a particular component.

Figure 4:
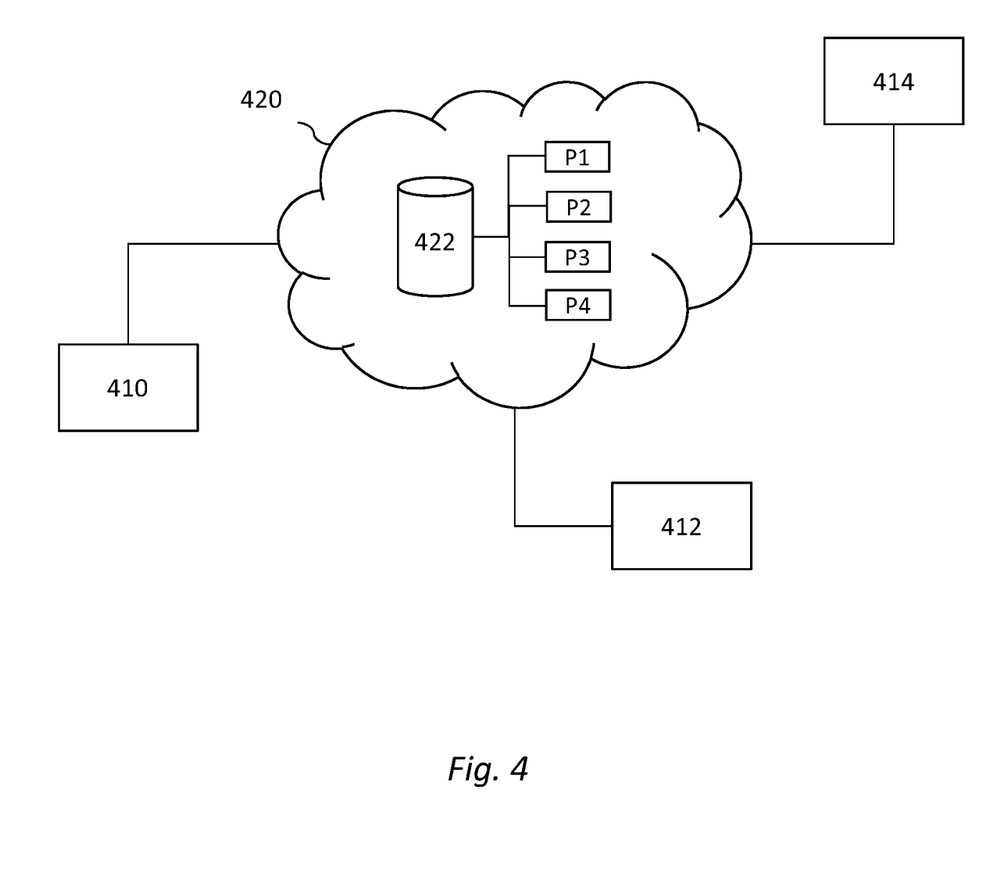
FIG. 4 schematically illustrates a clash detection system.

FIG. 4 schematically illustrates a clash detection system. The exemplary system of FIG. 4 shows project coordinator 410. Project coordinator 410 includes an operator and a workstation. Project coordinator 410 communicates through cloud-based-network 420 with collaborators 412 and 414. Each collaborator may be a project team member or an external contributor. By way of example, collaborator 412 may comprise a team of structural design engineers and collaborator 414 may comprise a team of electrical engineers cooperating to design a warehouse (not shown).

Project coordinator 410 receives project plans from each of collaborators 412 and 414. The project plans may include 2D or 3D design files for the structural and electrical components of the warehouse. Project plans may also include cost estimate, expected completion date and any other project information. The project plans can be stored locally at coordinator's workstation 410 or can be stored at database (memory) 422 on the cloud server. If stored at database 422, coordinator 420 may grant access to collaborators 412 and 414 to access the individual design files or the maser file. The project coordinator may also organize the files so as to maintain version control, record history of changes or apply any other project management rule.

The design files may have format native to each of the collaborator. To compile a master file, project coordinator 410 converts the collaborators' files into neutral format file and determines whether the compiled file is complex enough to require significant clash detection resources. If the master file is deemed complex, the project coordinator may access parallel processing at the cloud for clash detection. FIG. 4 shows an exemplary embodiment where memory circuit 422 communicates with four processors, P1-P4. It is noted that the processor number is not limited to four and may include as few or as many processors needed to conduct complex mathematical calculations.

Figure 3:
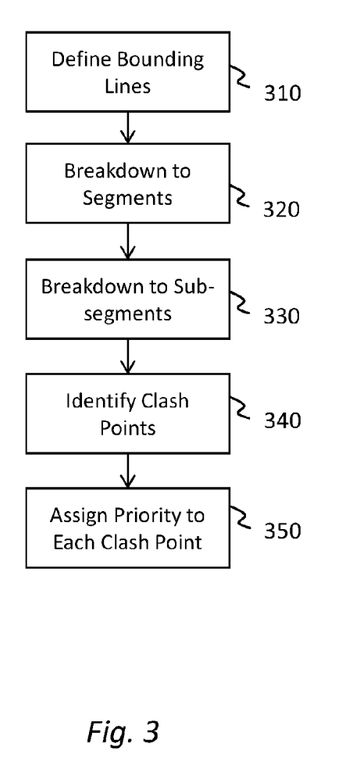
FIG. 3 is an exemplary clash detection flow diagram.

With simultaneous reference to FIGS. 3 and 4, the clash detection application divides the 3D model captured in the master file into four threads based on, for example, the number of bounding boxes encapsulating the respective objects in the master file. Each thread is then assigned to one of processors P1-P4 for analysis. The processors work independently of each other and in a massively parallel mode to simultaneously process significant clash detection algorithms. The detected clashes are then compiled and reported back to coordinator 410.

The project coordinator may optionally change software control variables. For example, project coordinator 410 may give access to one or more of the collaborators. The access can be full or limited (e.g., limited in time or scope). Project coordinator may also track changes by controlling and creating new versions of the software. In another exemplary embodiment, the project coordinator may reset clash detection variables That is, the clearance distance between different objects may be changed in real-time to observe the effect on the 3D model.

Figure 5:
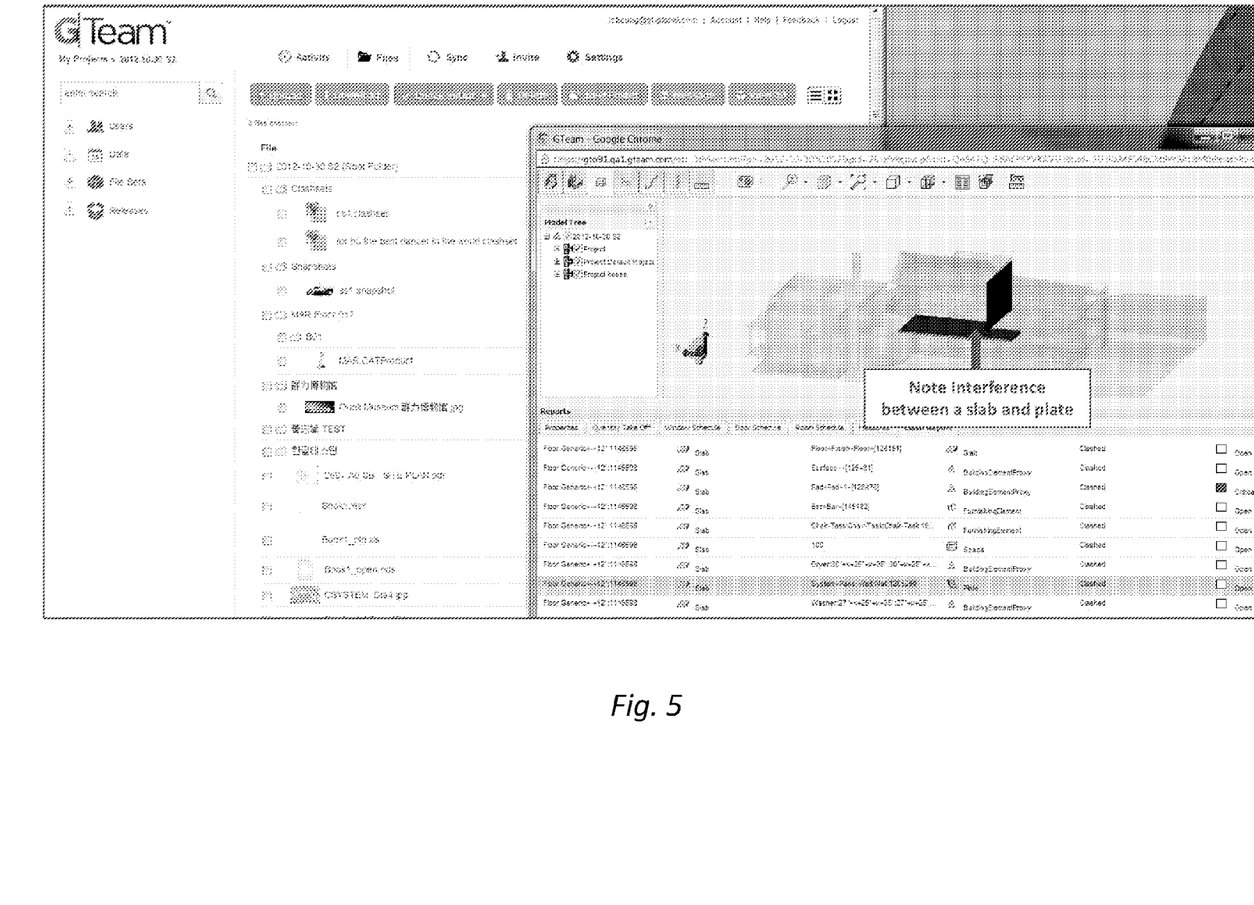
FIG. 5 is an exemplary clash detection report.

The clash detection report may include different fields selected by the project coordinator. In an exemplary embodiment, the clash report includes a clash list, classification of the clashing objects (e.g., window, door, etc.), the actual and desired tolerance between the clashing objects and the priority assigned to each clash (e.g., low, medium or critical). A 3D model may be included in the clash report showing the interfering objects. FIG. 5 is an exemplary clash report according to an embodiment of the disclosure. Specifically, FIG. 5 shows an exemplary clash detection application running on a web browser. As seen in FIG. 5, the clash detection application provides a background and a foreground dialog box. The background dialog box provides a file directory as well as action buttons (Upload, Download, Check In/Out, Delete, New Folder, Message and View 3D). The foreground dialog box is a clash detection report showing nine detected clashes, of which one is identified as critical. In addition, the clash detection report provides a 3D visual representation of the selected clash. The foreground dialog box states that there is an interference between a slab and a plate. The user may select other identified clashes from the selection box for visual display. The menu of the foreground dialog also provides action buttons including, zoon, 3D, snapshot, etc.

The clash detection application may additionally keep track of various equipment, their locations and service parameters. For example, the application may be queried to identify locations of the heating units in the design. The report may consist of an itemized list and/or 3D thumbnail illustration of the queried equipment. Once displayed, the project coordinator can further query the unit's service history or operation manual which may be stored on the same database.

In still another embodiment, the web-based application enables cost control. That is, project coordinator 410 can readily determine the cost associated with each design change. For example, replacement or relocation of a heating unit may have an immediate financial impact on the project budget. Using massively parallel processing capability disclosed herein, the budgetary impact of every design change can be immediately assessed. Finally, the application provides processing capability beyond clash detection allowing post-construction changes to viewed.

While the principles of the disclosure have been illustrated in relation to the exemplary embodiments shown herein, the principles of the disclosure are not limited thereto and include any modification, variation or permutation thereof.

What is claimed is:

1. An apparatus for detecting spatial interference between components of a three-dimensional (3D) building based on design data for construction of the 3D building, the apparatus comprising:
    a processor circuit in communication with a memory circuit, the memory circuit providing instructions for the processor circuit to:
    receive a first digital data file containing 3D designs for a plurality of first physical components, the plurality of first physical components defining a first aspect of the 3D building;
    receive a second digital data file containing 3D designs for a plurality of second physical components, the plurality of second physical components defining a second aspect of the 3D building, wherein the plurality of first physical components is composed of components that are a different type from the plurality of second physical components, and the first aspect of the 3D building is different from the second aspect of the 3D building;
    convert the first digital data file and the second digital data file to a common format;
    identify a reference point on the 3D building common to the 3D designs for the plurality of first physical components and the 3D designs for the plurality of second physical components;
    overlay the 3D designs for the plurality of first physical components over the 3D designs for the plurality of second physical components based on the reference point to form a master digital data file;
    identify a spatial interference between at least one of the plurality of first physical components and at least one of the plurality of second physical components using the master digital file, wherein identification of the spatial interference indicates that at least one of the plurality of first physical components impinges on an allotted space for at least one of the plurality of second physical components, wherein the allotted space includes a clearance space adjacent to the at least one of the plurality of second physical components; and
    report the identified interference.

2. The apparatus of claim 1, wherein the processor overlays the 3D designs for the plurality of first physical components over the 3D designs for the plurality of second physical components by resolving the plurality of first physical components over the plurality of second physical components as a function of the reference point.

3. The apparatus of claim 1, wherein the processor circuit identifies the spatial interference by forming a bounding box around each of the physical components and determining whether the bounding boxes interfere.

4. The apparatus of claim 3, wherein the processor circuit identifies the spatial interference when the distance between the bounding boxes is below a first threshold.

5. The apparatus of claim 4, wherein the first threshold is determined as a function of at least one of the physical components.

6. The apparatus of claim 1, wherein the processor circuit identifies a plurality of interferences.

7. The apparatus of claim 1, wherein the processor circuit receives the first digital data file from a first remote station and receives the second digital data file from a second remote station.

8. The apparatus of claim 1, wherein the processor circuit receives the first digital data file and the second digital data file from a first remote station.

9. The apparatus of claim 1, wherein the processor circuit and the memory circuit define a remote server.

10. The apparatus of claim 1, wherein the processor circuit divides the master digital data file into a first partitioned file and a second partitioned file, and wherein the first partitioned file is assigned to a first remote processor to identify spatial interferences and the second partitioned file is assigned to a second remote processor to identify spatial interferences.

11. An apparatus for detecting spatial interference between components of a three-dimensional (3D) building based on design data for construction of the 3D building, the apparatus comprising:
    a processor circuit in communication with a memory circuit, the memory circuit providing instructions for the processor circuit to:
    receive a first digital data file containing 3D designs for a plurality of first physical components, the plurality of first physical components defining a first aspect of the 3D building;
    receive a second digital data file containing 3D designs for a plurality of second physical components, the plurality of second physical components defining a second aspect of the 3D building, wherein the plurality of first physical components is composed of components that are a different type from the plurality of second physical components, and the first aspect of the 3D building is different from the second aspect of the 3D building;
    identify a reference point on the 3D building common to the 3D designs for the plurality of first physical components and the 3D designs for the plurality of second physical components;

resolve the 3D designs for the plurality of first physical components over the 3D designs for the plurality of second physical components based on the reference point to form a compiled digital data file;

partition the compiled digital data file into a plurality of independent portions, each independent portion defining at least one of the plurality of first physical components or at least one of the plurality of second physical components;

defining a bounding box for each of the plurality of first physical components and each of the plurality of second physical components, each bounding box defining a smallest geometrical enclosure completely containing the respective physical component;

identify a spatial interference between one of the plurality of first physical components and one of the plurality of second physical components based on a distance between a bounding box associated with the one of the plurality of first physical components and a bounding box associated with the one of the plurality of physical second components, wherein the spatial interference is identified when the bounding box associated with the one of the plurality of first physical components impinges on an allotted space for the bounding box associated with the one of the plurality of physical second components, wherein the allotted space includes a clearance space adjacent to the bounding box associated with the one of the plurality of second physical components.

12. The apparatus of claim 11, wherein the memory circuit further provides instructions to the processor circuit to convert the first digital data file and the second digital data file to a neutral format.

13. The apparatus of claim 11, wherein the processor circuit iteratively partitions each of the independent portions until each one of the plurality of first physical components and each one of the plurality of second physical components is entirely contained in a respective bounding box.

14. The apparatus of claim 11, wherein the processor circuit identifies the spatial interference by determining whether a distance between the respective bounding boxes is below a first threshold.

15. The apparatus of claim 14, wherein the first threshold is determined as a function of at least one of the physical components.

16. The apparatus of claim 11, wherein the processor circuit and the memory circuit define a remote server and wherein the first digital data file and the second digital data file are sent to the remote server from one or more computers.

17. The apparatus of claim 11, wherein the first aspect of the 3D building includes at least one of structural, mechanical, electrical, or plumbing, and the second aspect of the 3D building includes at least one of structural, mechanical, electrical, or plumbing.

18. The apparatus of claim 1, wherein the first aspect of the 3D building includes at least one of structural, mechanical, electrical, or plumbing, and the second aspect of the 3D building includes at least one of structural, mechanical, electrical, or plumbing.

* * * * *

UNITED STATES PATENT AND TRADEMARK OFFICE
CERTIFICATE OF CORRECTION

PATENT NO. : 9,489,472 B2  
APPLICATION NO. : 13/717371  
DATED : November 8, 2016  
INVENTOR(S) : Jaemin Lee et al.

Page 1 of 1

It is certified that error appears in the above-identified patent and that said Letters Patent is hereby corrected as shown below:

In the Specification

In Column 1, Lines 12-13, after "U.S. patent application Ser. No." please delete "13/71,620" and insert --13/717,620--

In Column 1, Lines 14-15, after "filed on" please delete "an even date herewith and fully incorporated herein by reference" and insert --December 17, 2012, which is herein incorporated by reference in its entirety for all purposes.--

Signed and Sealed this  
First Day of August, 2017

Joseph Matal  
*Performing the Functions and Duties of the*  
*Under Secretary of Commerce for Intellectual Property and*  
*Director of the United States Patent and Trademark Office*